United States Patent
Byers et al.

(10) Patent No.: US 10,218,781 B2
(45) Date of Patent: Feb. 26, 2019

(54) CONTROLLING LATENCY IN MULTI-LAYER FOG NETWORKS

(71) Applicant: Cisco Technology, Inc., San Jose, CA (US)

(72) Inventors: Charles Calvin Byers, Wheaton, IL (US); Joseph Michael Clarke, Raleigh, NC (US); Gonzalo Salgueiro, Raleigh, NC (US)

(73) Assignee: Cisco Technology, Inc., San Jose, CA (US)

(*) Notice: Subject to any disclaimer, the term of this patent is extended or adjusted under 35 U.S.C. 154(b) by 114 days.

(21) Appl. No.: 15/491,862

(22) Filed: Apr. 19, 2017

(65) Prior Publication Data

US 2018/0309821 A1 Oct. 25, 2018

(51) Int. Cl.
*G06F 15/173* (2006.01)
*H04L 29/08* (2006.01)

(52) U.S. Cl.
CPC ............ *H04L 67/101* (2013.01); *H04L 67/12* (2013.01)

(58) Field of Classification Search
CPC .............................. H04L 67/101; H04L 67/12
USPC ................................................. 709/226, 224
See application file for complete search history.

(56) References Cited

U.S. PATENT DOCUMENTS

| | | | |
|---|---|---|---|
| 9,154,394 B2 | 10/2015 | Ko et al. | |
| 9,491,076 B2 | 11/2016 | Mermoud et al. | |
| 2012/0124194 A1* | 5/2012 | Shouraboura | H04L 45/122 709/224 |
| 2012/0127183 A1 | 5/2012 | Vonog et al. | |
| 2015/0201017 A1 | 7/2015 | Hrischuk et al. | |
| 2015/0249586 A1 | 9/2015 | Byers et al. | |
| 2016/0020987 A1 | 1/2016 | Wetterwald et al. | |
| 2016/0117241 A1* | 4/2016 | Shah | G06F 12/0871 711/119 |
| 2017/0155557 A1* | 6/2017 | Desai | H04L 41/147 |
| 2017/0272342 A1* | 9/2017 | Zessin | H04L 41/145 |
| 2017/0295109 A1* | 10/2017 | Byers | H04Q 1/00 |
| 2017/0366472 A1* | 12/2017 | Byers | H04L 67/10 |
| 2018/0253084 A1* | 9/2018 | Diaz | G05B 19/042 |

OTHER PUBLICATIONS

Lee, Edward A., "The Problem with Threads", Computer, vol. 39, No. , pp. 33-42, May 2006, doi:10.1109/MC.2006.180.

* cited by examiner

*Primary Examiner* — Philip B Tran
(74) *Attorney, Agent, or Firm* — Parker Ibrahim & Berg LLP; James M. Behmke; Stephen D. LeBarron (57) ABSTRACT

In one embodiment, an intermediate node, of a multi-stage process path through a computer network, receives a workload message with an associated latency budget to complete the multi-stage process at a final stage device. In response, the intermediate node determines a current latency from an initial stage device for the workload message to the receiving of the workload message, and also determines a remaining portion of the latency budget based on the current latency. In response to the remaining portion of the latency budget being less than expected at the intermediate node, the intermediate node may perform one or more latency-reducing actions, and then transmits the workload message toward the final stage device.

20 Claims, 6 Drawing Sheets

CONTROLLING LATENCY IN MULTI-LAYER FOG NETWORKS

TECHNICAL FIELD

The present disclosure relates generally to computer networks, and, more particularly, to controlling latency in multi-layer fog networks.

BACKGROUND

Controlling latency is a primary reason to employ fog computing in Internet of Things (IoT) networks. Many critical IoT applications, in areas as diverse as smart transportation, virtual/augmented reality, tactile internet, financial networks, smart grids, robotics, smart buildings, and manufacturing have latency requirements on the order of 1 ms-10 ms, and cloud-only architectures (with typical latency on the order of 100 ms) are hopelessly slow. However, even networks specifically designed for fog computing are not always equipped to adequately control latency of communication through the network, particularly where there are hierarchies of fog nodes, sometimes four or more layers deep, that may be used to implement distributed processing applications (e.g., especially sophisticated analytics) that are partitioned into multiple pipeline stages across is the fog layers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an intermediate node, of a multi-stage process path through a computer network, receives a workload message with an associated latency budget to complete the multi-stage process at a final stage device. In response, the intermediate node determines a current latency from an initial stage device for the workload message to the receiving of the workload message, and also determines a remaining portion of the latency budget based on the current latency. In response to the remaining portion of the latency budget being less than expected at the intermediate node, the intermediate node may perform one or more latency-reducing actions, and then transmits the workload message toward the final stage device.

According to one or more additional embodiments of the disclosure, a processing device receives latency data associated with a workload message that has passed through a multi-stage process path through a computer network, the multi-stage process having an associated latency budget to complete the multi-stage process at a final stage device. The processing device may then determine that the multi-stage process was completed after expiration of the associated latency budget at the final stage device. After examining the latency data to determine a corresponding latency of each stage of the multi-stage process, the processing device may then determine one or more latency-reducing actions along the multi-stage process path, and transmits instructions to perform the one or more latency-reducing actions to processing nodes along the multi-stage processing path, accordingly.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
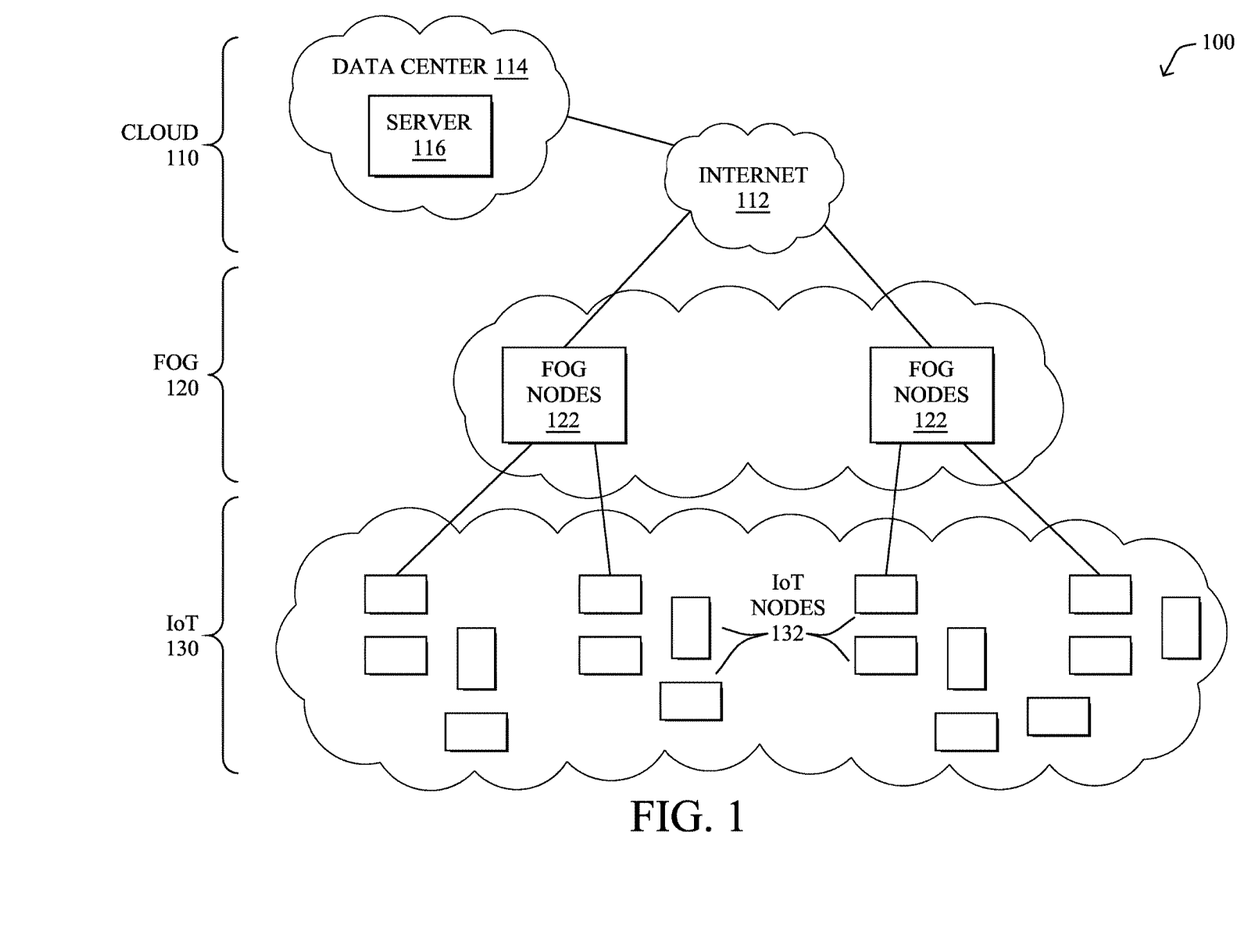
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, optionally across multiple fog layers, as described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations or tenants. This can cause a long-tail distribution in latency a given set of application data experiences as it passes through network 100, and the resulting load-dependent uncertainty in system performance is one of the motivations for using the techniques described below.

Those skilled in the art will understand that any number of nodes, devices, links, etc. may be used in the computer network, and that the view shown herein is for simplicity.

Also, those skilled in the art will further understand that while the network is shown in a certain orientation, the network 100 is merely an example illustration that is not meant to limit the disclosure.

Figure 2:
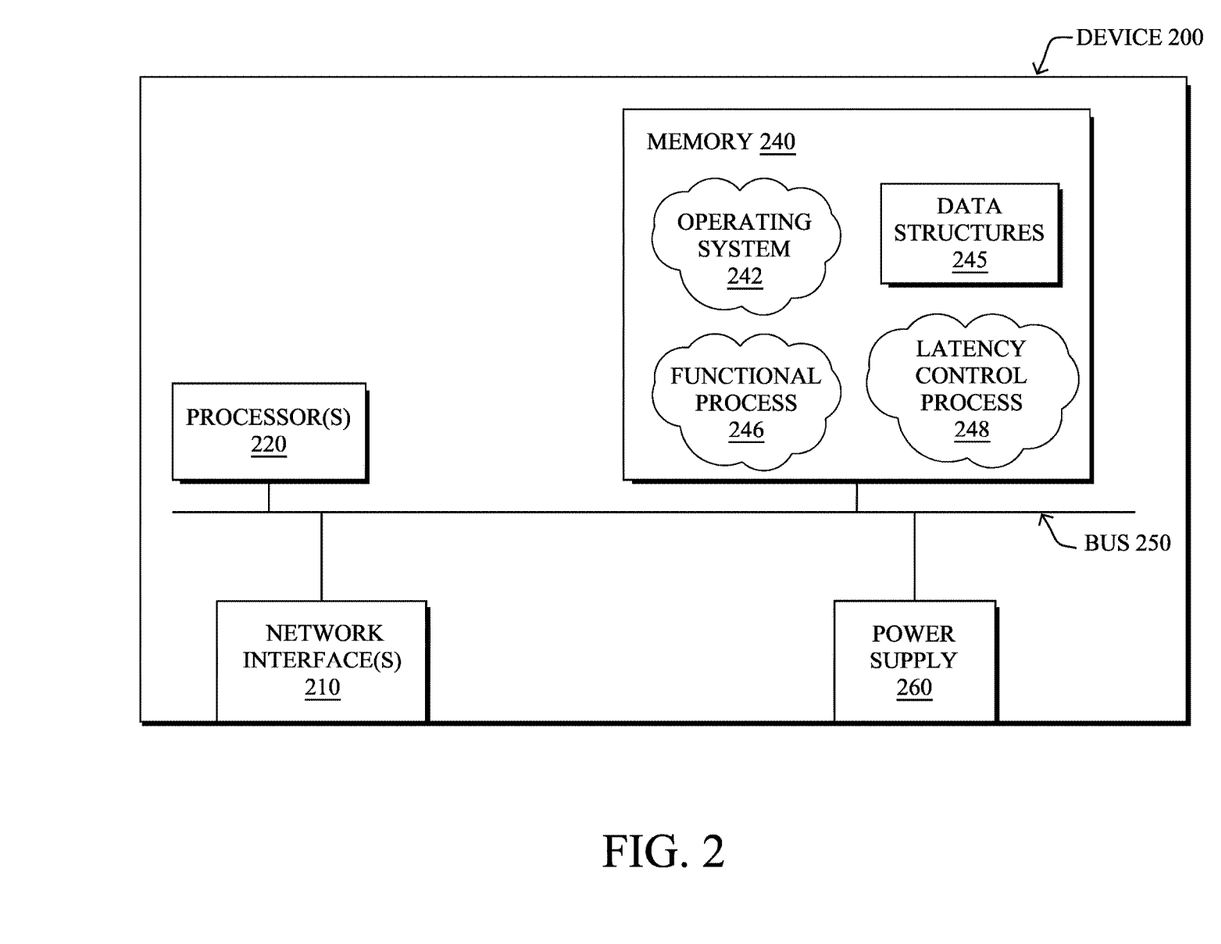
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network is connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "latency control" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Controlling Latency in Multi-Layer Fog Networks——

As noted above, controlling latency is a primary reason to employ fog computing in IoT networks. Critical IoT applications, for example, may have latency requirements on the order of 1 ms-10 ms. As also mentioned above, fog computing networks are not always equipped to adequately control latency of communication through the network, particularly where there are hierarchies of fog nodes (e.g., four or more layers) that implement distributed processing applications that are partitioned into multiple pipeline stages across the fog layers.

As will be appreciated by those skilled in the art, many fog nodes have heterogeneous compute architectures, where X86, ARM, GPGPU, DPS, and FPGA based computing resources all coexist. Applications may have a choice between these compute resources, representing a trade-off between latency performance and cost (monetary or energy) an application utilizes to perform the processing. Some applications run best on resources with high single thread performance, others work well on large parallel arrays of simple processors, while still others are optimally served on compute resources with specialized instruction sets or hardware execution of key processes.

Latency may also be impacted by the routing functions included in fog nodes. That is, fog nodes can assign different queuing priorities, protocol stacks, and speeds of inter-node facilities to different application flows to greatly impact the latency contribution of the network. Often, premiums could be paid by applications to purchase higher priority, better QoS, or faster link speeds for a specific packet flow or application.

Applications that require storage may have choices that impact latency too, perhaps using expensive in-memory caches, moderately priced flash drives or inexpensive but slower hard disks. Storage typically gets cheaper as it is hosted further up the fog hierarchy toward the cloud, but also slower, creating a trade-off.

Finally, there may be choices as to the sophistication of the processing operations performed on each fog node. Faster, but less accurate processing algorithm alternatives may exist, and some stages of a complex processing pipeline may be optional, and could be skipped at the expense of some reduced accuracy of the results. Some algorithms create periodic samples or "bursty" streams, and have adjustable precision, and the settings of these could be modified (for example video frame rate or pixel count). Each application thus needs to balance its requirements for low latency and highly accurate results.

Fog networks need to effectively balance all these options on how a given set of applications will use the available resources. Requesting too many high-performance resources costs too much money and energy, while not requesting enough will cause the application to miss its quality of service and latency goals.

The techniques herein, therefore, provide a highly dynamic way to tune the latency performance of an application that is distributed over multiple layers of fog infrastructure, while meeting requirements for accuracy and overall cost. In particular, the embodiments herein improve the chances that multi-stage applications pipelines in real-time critical hierarchical fog networks will achieve their latency targets. Illustratively, this may be accomplished by measuring actual pipeline stage latency early in the processing, and selectively applying higher performing or more resources, or simplified algorithms to later stages if the application is in danger of running behind its latency targets.

Specifically, according to one or more embodiments of the disclosure as described in detail below, the techniques herein measure the exact latency through each processing stage and link/hop in a multi-stage process path (e.g., a multi-layer fog hierarchy). It uses these measurements as timestamped workload messages traverse the network through sequential pipeline stages to select the resources in later stages of a processing pipeline based upon the measured latency in earlier stages. That is, if earlier stages of a processing pipeline use more time than their allocation, later stages of the pipeline in subsequent nodes can apply optional faster (but potentially more expensive) resources, more resources in parallel, or reduce the complexity of their operations performed on the data streams to try to "catch up" and deliver the final results of the processing pipeline inside the critical latency window for the application. Conversely, if partway through a processing pipeline it is discovered that the latency encountered up to that point is less than expected, later stages can use slower (and potentially less expensive) resources and still complete the pipeline's tasks in time.

Illustratively, the techniques described herein may be performed by hardware, software, and/or firmware, such as in accordance with the latency control process 248, which may include computer executable instructions executed by the processor 220 to perform functions relating to the techniques described herein, e.g., in conjunction with corresponding processes of other devices in the computer network as described herein.

Figure 3:
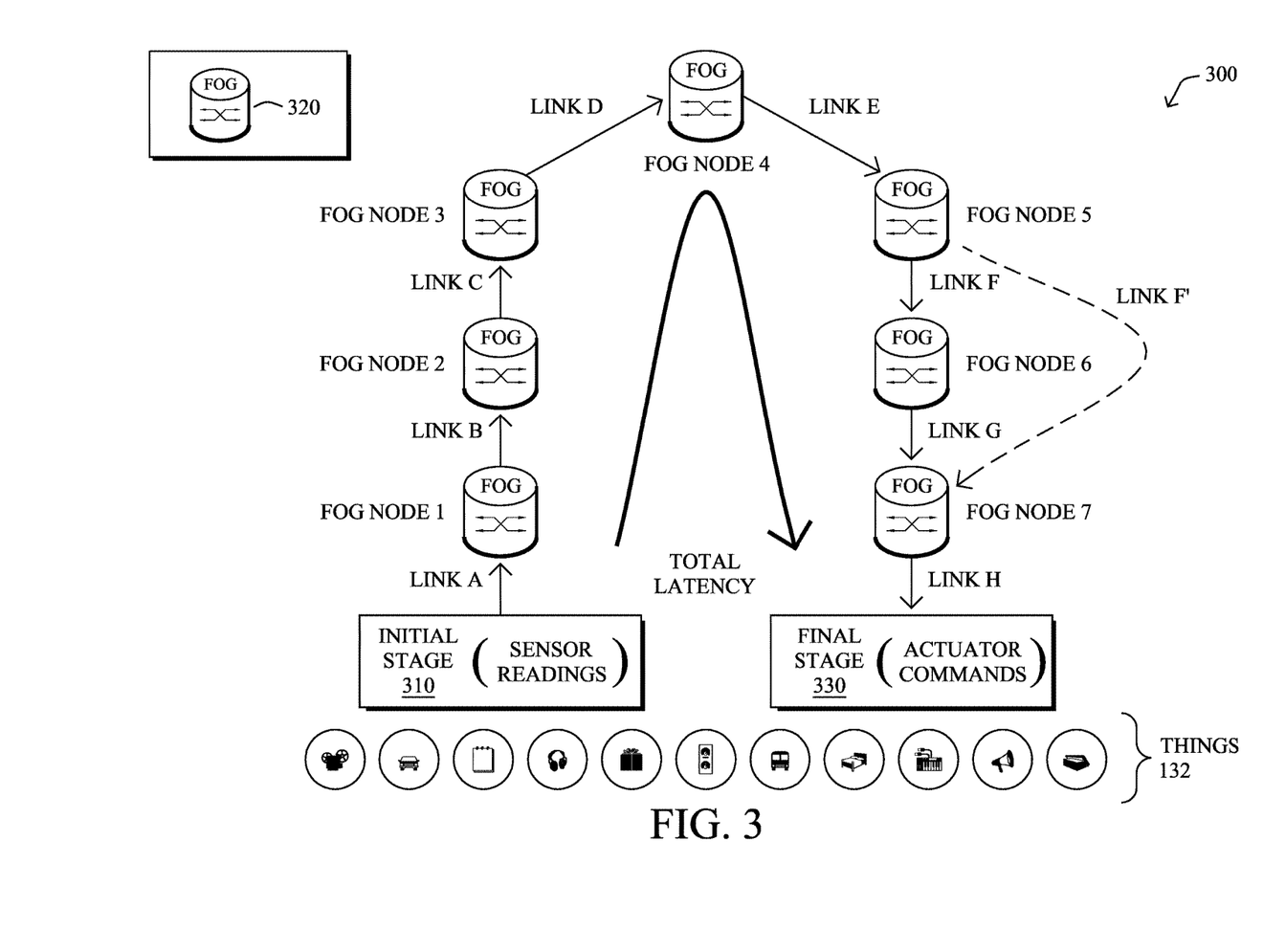
FIG. 3 illustrates an example multi-stage process path through a computer network.

Operationally, the techniques herein relate to multi-stage processing paths, such as, illustratively, a multi-layer fog processing pipeline. FIG. 3 illustrates an example multi-stage processing path (or pipeline) 300, where an "initial stage device" 310 (e.g., IoT devices 132) sends a workload message 400 (described below) through one or more intermediate nodes 320 (e.g., fog nodes 122) for processing, until ultimately reaching one or more "final stage devices" 330.

As shown in the example of FIG. 3, a processing pipeline 300 may be implemented on a four-layer-deep hierarchy of fog nodes (for example in a smart city, fog nodes 1 and 7 could be at the local level, fog nodes 2 and 6 could be at the neighborhood level, fog nodes 3 and 5 could be at the regional level, and fog node 4 could be a city-level node at the bottom of the cloud layer). Sensor readings from an initial stage device (for example a video stream from an IoT security camera) may traverse fog nodes 1, 2, 3 and 4, with processing pipeline stages at intermediate nodes 320 implementing parts of the overall algorithm at each node. Then, control commands follow the path through nodes 5, 6, and 7, with processing pipeline stages at each layer, until they arrive at an actuator in final stage 330 beyond fog node 7. We presume that the total latency of this hierarchical processing pipeline has a strict upper latency limit for the applications in question, after which the results are outdated and useless, or the physical system under control could develop stability or safety problems. (Note that "final stage device" 330 may be calculated herein as node 7 or the actuator, depending on the definition of the latency: i.e., a time the message 400 must be sent from node 7 or received by the actuator, or a time the actuator must process and complete the desired action.)

Figure 4:
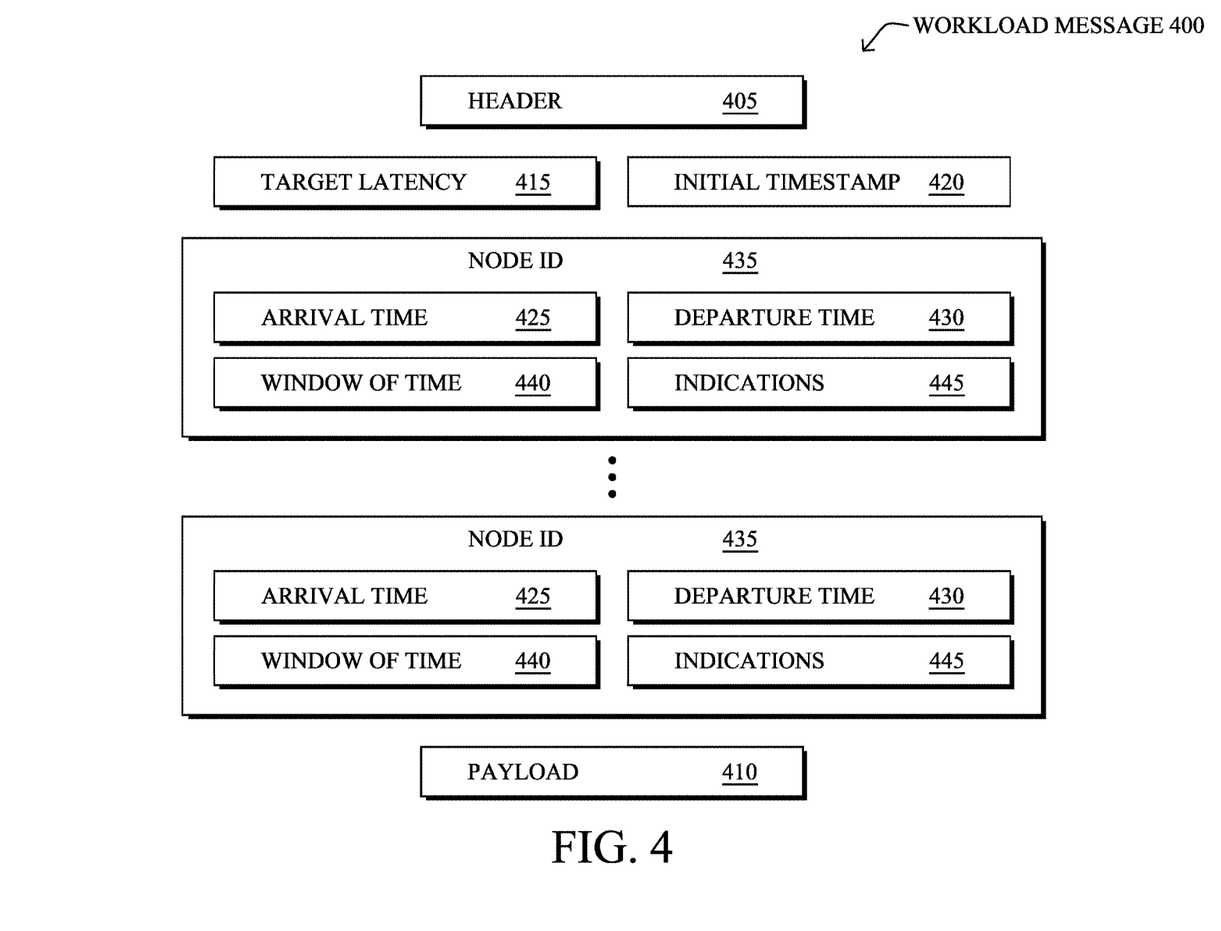
FIG. 4 illustrates an example message format.

An example simplified format for a workload message 400 is shown in FIG. 4, where, illustratively, the message 400 (e.g., a packet or a container of data) comprises a header

405 (e.g., with routing information such as source and destination addresses, explicit network paths, etc.) and a payload 410 (e.g., the data to be processed, instructions for processing, and so on). Additionally, in accordance with one or more embodiments herein, the message 400 may also carry, within metadata records (e.g., attached to the message's header information or carried within a container), a target latency 415, an initial timestamp 420, fields for arrival time 425 and departure time 430 that is filled in by each intermediate node 320 along the path (node ID 435). Optionally, an expected window of time 440 for each node ID 435 may be predefined within the message 400, or else one or more flags or other indications 445 may be used by the intermediate nodes to show a difference in expected delay (e.g., over or under), as described herein.

Illustratively, each workload message 400 in the network is given an initial precision time stamp 420 from an initial stage device (e.g., either on the source sensor or upon the raw sensor data entering fog node #1). Each intermediate fog node 320 in the pipeline 300 records the arrival time 425 and departure time 430 of the data. Node processing latency may be derived by subtracting arrival time from departure time for each node. Link transit time may be derived by subtracting departure time at one node's inter-fog interface from arrival time at a subsequent node (in one embodiment, network queuing time in a node's output port logic is included in this latency). The target maximum latency 415 for the data to traverse the entire pipeline is determined at service inception and noted in the metadata, and specific allocations of portions (windows 440) of this time could be assigned to each processing stage (optionally based upon machine learning, described below) to establish targets, that when exceeded would potentially cause some action in later pipeline stages. Notably, network time protocols may be used to ensure that all the clocks on all the nodes remain synchronized. When a message 400 completes the process (by passing through seven nodes and eight links in this example), the metadata that is associated with the application data has accumulated a detailed record of all the node and link contributions to the total latency the data experienced. Hopefully, in the vast majority of cases, this accumulated latency over this sensor-to-actuator round trip path will be less than the target maximum latency.

If the latency is running too high (perhaps due to overloaded processors or slow storage in one or more nodes, or long packet queues associated with the fog node to fog node links), the techniques herein provide for one or more on-demand latency-reducing actions to be performed. In particular, the techniques herein monitor the latency metadata upon the message's arrival in each of the intermediate fog nodes in the pipeline. If it appears the accumulated latency is in line with the allocations for the previous stages, the node will process the packet using the normal algorithms run on the usual resources with standard parameters.

Notably, the determination as to whether the message is currently "on schedule" (i.e., there is an expected remaining latency to process the message on its way to the final stage) may be based on comparing the expected time (window 440) for the particular intermediate node to the actual computed time, or else based on determining a threshold amount of delay from flags/indications 445 (e.g., one or more intermediate nodes took longer than expected). Any suitable measurement of actual latency versus expected latency may be used herein, and those mentioned are merely examples for illustration.

However, if for whatever reason, the latency is running higher than expected upon entering a given processing stage, that intermediate node 320 may attempt to identify different sets of resources or algorithm settings that can allow it to complete the subsequent pipeline stage faster and "catch up" with the overall latency target by reducing the probable latency in the local node. If all fog nodes in the pipeline have this capability, there is a much higher probability that the total latency through the entire pipeline will come in under the maximum latency target, and the system under control will stay stable and safe.

Making these changes to the processing strategy at individual nodes is not without cost, however. Using faster processing resources or more of them in parallel typically costs more money and energy. Using faster types of intermediate storage will exhaust the limited amounts of these resources in a fog node faster. Using high priority output queues and faster link facilities will exhaust link resources, potentially delaying other traffic that shares them, and incur larger network bandwidth costs. Therefore, the techniques herein may decide to use the more expensive resources when necessary because excess latency in earlier stages caused the message to fall behind in processing a specific data set for a specific, limited time interval. For example, in a well-designed hierarchical processing pipeline, less than 1% of the data that traverse this control loop should be subject to this special treatment.

Sometimes, the adjustment made in later stages of the pipeline may not change the type or speed of hardware the process is executing on, but the algorithms that are executing. For example, sometimes algorithms could be launched with different parameters that cause them to finish faster, but at the expense of accuracy, quality or data size. For instance, less sophisticated image compression algorithms will finish faster, but their compression efficiency is less, and their data sets are larger. Occasional frames of video or sensor reading can be dropped to save processor cycles, if the consequence of missing something isn't too severe. Sometimes (as depicted by the dotted arrow in FIG. 3 between fog nodes 5 and 7 along link F'), entire stages of the processing pipeline could be skipped if the pipeline latency is in danger of missing its target. For example, in an image processing system that recognizes objects in a security camera feed, steps like contrast enhancement or color correction could be skipped, at the expense of slightly worse image recognition accuracy. Many examples exist in complex processing pipelines from various applications from various verticals where the parameters of a given stage of a processing pipeline can be adjusted, or stages can be occasionally skipped, and the system will still produce useful results without serious degradation noticed by its users. (A goal is to not make those compromises consistently, or perceived end-to-end system performance or accuracy statistics will suffer.)

As a detailed example of the techniques herein, assume a multi-stage image processing pipeline for a smart city application that is designed to prevent vehicle—pedestrian collisions is running on the four level fog hierarchy shown in FIG. 3. In order to have acceptable probability sending a breaking command over the vehicle-to-infrastructure (V2I) network to a car that is in danger of hitting a pedestrian, it may be desired to complete this round trip in 25 ms. In this example, fog nodes 1, 2 and 3 may perform contrast enhancement, feature extraction, and pattern matching on a video stream, and are allocated 2, 5, and 3 milliseconds to complete these tasks, respectively. Links A, B, C, and D are each allocated 1 ms of queuing and transport delays. Therefore, under normal operation, the pattern matched results should enter fog node 4 no later than 14 ms after the raw data left the camera into link A. However, in this example, assume fog node 2 is temporarily overloaded, and instead of the allocation of 5 ms, the measured latency data shows it took 8 ms. Also, because of a larger than normal queuing delay out of fog node 3, it took 3 ms for the data to traverse link D instead of the 1 allocated. The data is therefore entering fog node 4 at time=19 ms, 5 ms late. Further, assume the budgets for processing stages hosted in fog nodes 4, 5, 6, and 7 are 3, 1, 2, and 1 ms, respectively, and links E, F, G, and H are allocated 1 ms each. The techniques herein can thus try to make up the 5 ms deficit by reducing the complexity of the second half of the pipeline. Fog node 4 is applying heuristics to the pattern matched data, for example trying to classify the type of vehicle or pedestrian. Since the multi-stage process is running behind, the intermediate nodes may intelligently decide to use a combination of techniques to reduce the overall latency. For example, processing can be moved from moderately priced X86 processors to more expensive (but faster) GPGPU arrays. Also, more processor cores can be applied in parallel. Further, a stage may be simplified to simply determine that a collision between vehicle and a human is going to happen with high probability, and this temporary processor speed upgrade and algorithm simplification saves us 2 ms. Fog node 6 may be tasked with determining the dynamic performance expected of a vehicle to determine if it should be commanded to brake or swerve. However, if the multi-stage process is running out of time, fog node 5 could be instructed to always select the brake application options, and skip past fog node 6 via link F'. This eliminates the 2 ms processing latency of fog node 6, and one network hop, gaining back an additional 3 ms, and allowing completion of the entire pipeline in exactly the 25 ms allocated time. The accuracy of the result may be slightly reduced during this cycle through the loop, but a result is available in time to save the pedestrian. During the next cycle of data through the loop, chances are the same delays won't be encountered in node 2 and link D, each stage will closely track its latency allocation, and no special treatment will be required.

All of the telemetry collected about pipeline stage processing latency and inter-stage transport latency may be invaluable for tuning the performance of the multi-stage process (e.g., hierarchical fog applications) and window of time allocations 440 for each stage. The latency traces from messages 400 could be fed into Machine Learning (ML) algorithms (e.g., on server 116) to detect patterns in delay (perhaps correlated across many applications sharing the fog infrastructure, at many different times). The ML algorithms use these detected patterns to optimize the latency targets for each stage, and generate predictions as to which pipeline stages will help improve the latency the most if simplified or eliminated (or predict when latency might be seen later in the pipeline in order to pre-optimize the path), while creating minimal impact on application performance and accuracy. These recommendations in turn may be fed into the logic in each stage that figures out what to do if the pipeline is running behind. ML is also valuable to determine the network-wide cost impact of certain decisions that are made, choosing the best processor technology or algorithm alternative, and can help preserve the operational cost of running the application.

Figure 5:
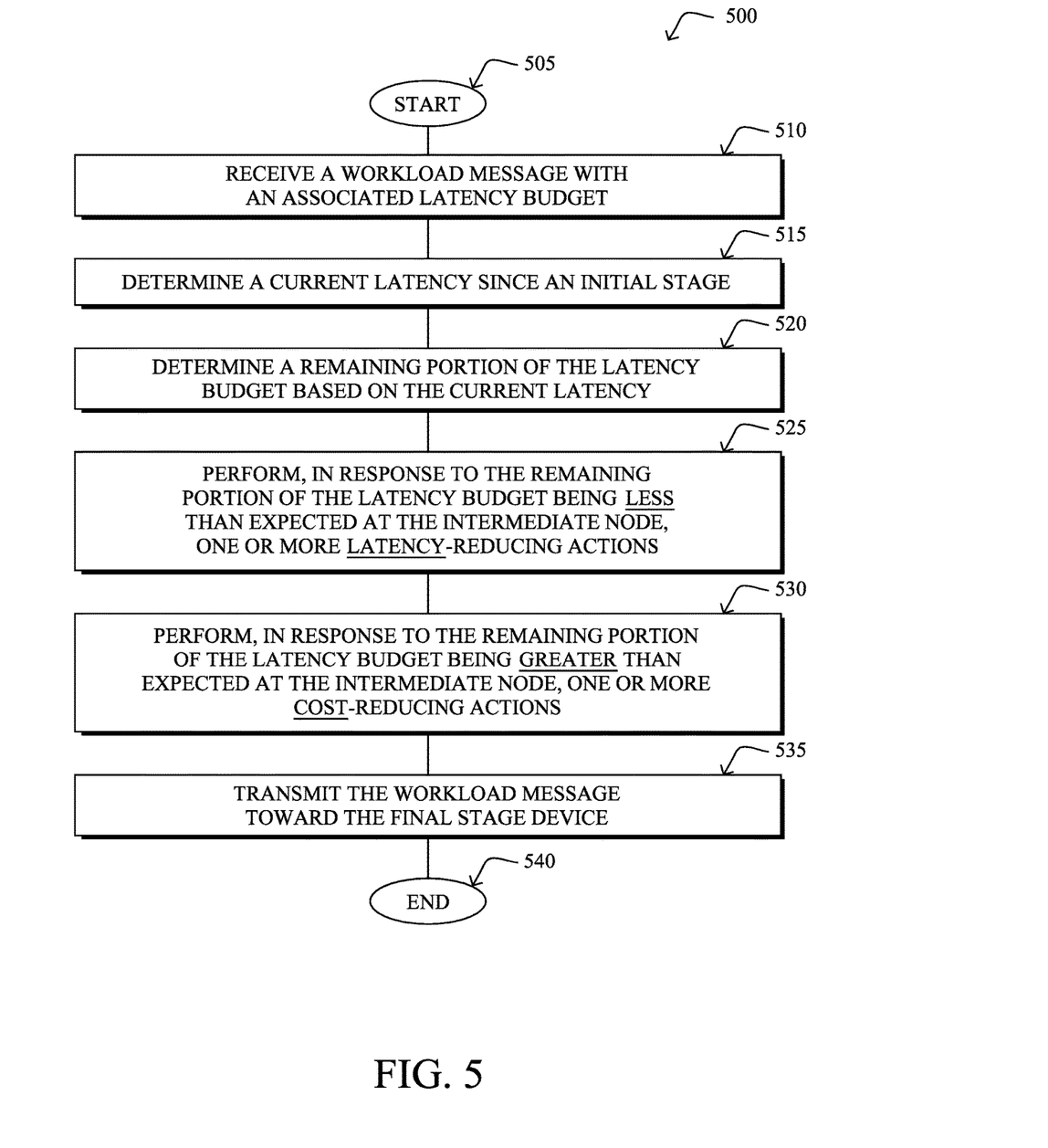
FIG. 5 illustrates an example simplified procedure for controlling latency in multi-layer fog networks, particularly from the perspective of an intermediate node along a multi-stage processing path.

FIG. 5 illustrates an example simplified procedure for controlling latency in multi-layer fog networks in accordance with one or more embodiments described herein, particularly from the perspective of an intermediate node 320 along a multi-stage processing path 300. For example, a non-generic, specifically configured device (e.g., device 200) may perform procedure 500 by executing stored instructions (e.g., process 248). The procedure 500 may start at step 505, and continues to step 510, where, as described in greater detail above, an intermediate node 320 of a multi-stage process path 300 (e.g., a multi-layer hierarchical fog process) through a computer network 100 receives a workload message 400 with an associated latency budget 415 to complete the multi-stage process at a final stage device 330. Note that as mentioned above, the multi-stage process may illustratively be a multi-layer hierarchical fog process that passes from a sensor node as the initial stage device along the path to an actuator node as the final stage device (e.g., optionally passing through one or more cloud nodes), though any suitable multi-stage process may utilize the techniques herein.

In step 515, the intermediate node determines a current latency from an initial stage device for the workload message to the receiving of the message, such as through comparing the initial timestamp 420 to a current time. Then, in step 520, the intermediate node may determine a remaining portion of the latency budget based on the current latency (i.e., how much time is left to complete the process). Note that in an alternative embodiment, determining the remaining portion may be specifically based on prescribed windows of time 440, rather than a calculation of remaining time (i.e., is the node ahead of, within, or behind its allotted window of time?).

According to the techniques described above, in step 525, in response to the remaining portion of the latency budget being less than expected at the intermediate node (e.g., calculated remaining time, compliance to the prescribed window of time, etc.), the intermediate node may perform one or more latency-reducing actions. For instance, as mentioned above, performing one or more latency-reducing actions may comprise various options, such as (among others):

using faster processing hardware to complete a corresponding stage of processing at the intermediate node;
  using reduced complexity processing software to complete a corresponding stage of processing at the intermediate node;
  reducing the complexity of the dataset being operated upon (e.g., down-sampling the resolution or frame rate of a video stream);
  skipping a corresponding stage of processing at the intermediate node; and/or
  skipping one or more subsequent intermediate nodes and corresponding stages of processing of the one or more subsequent intermediate nodes.

In certain circumstances, in step 530 the intermediate node may alternatively be able to perform one or more cost-reducing actions in response to the remaining portion of the latency budget being greater than expected at the intermediate node (e.g., using slower, less costly resources to complete a corresponding stage of processing at the intermediate node).

In step 535, the intermediate node may then transmit the workload message toward the final stage device 330 (e.g., to a subsequent node, or skipping over a node and passing control to the second node down a pipeline, or to the final stage device itself). As mentioned above, the intermediate node may record an arrival time 425 and a departure time 430 within the workload message 400, e.g., upon receipt in step 510 and transmission in step 535, respectively.

The example simplified procedure may then end in step 540, notably with the option to receive further messages and to react to the timing constraints, accordingly.

Figure 6:
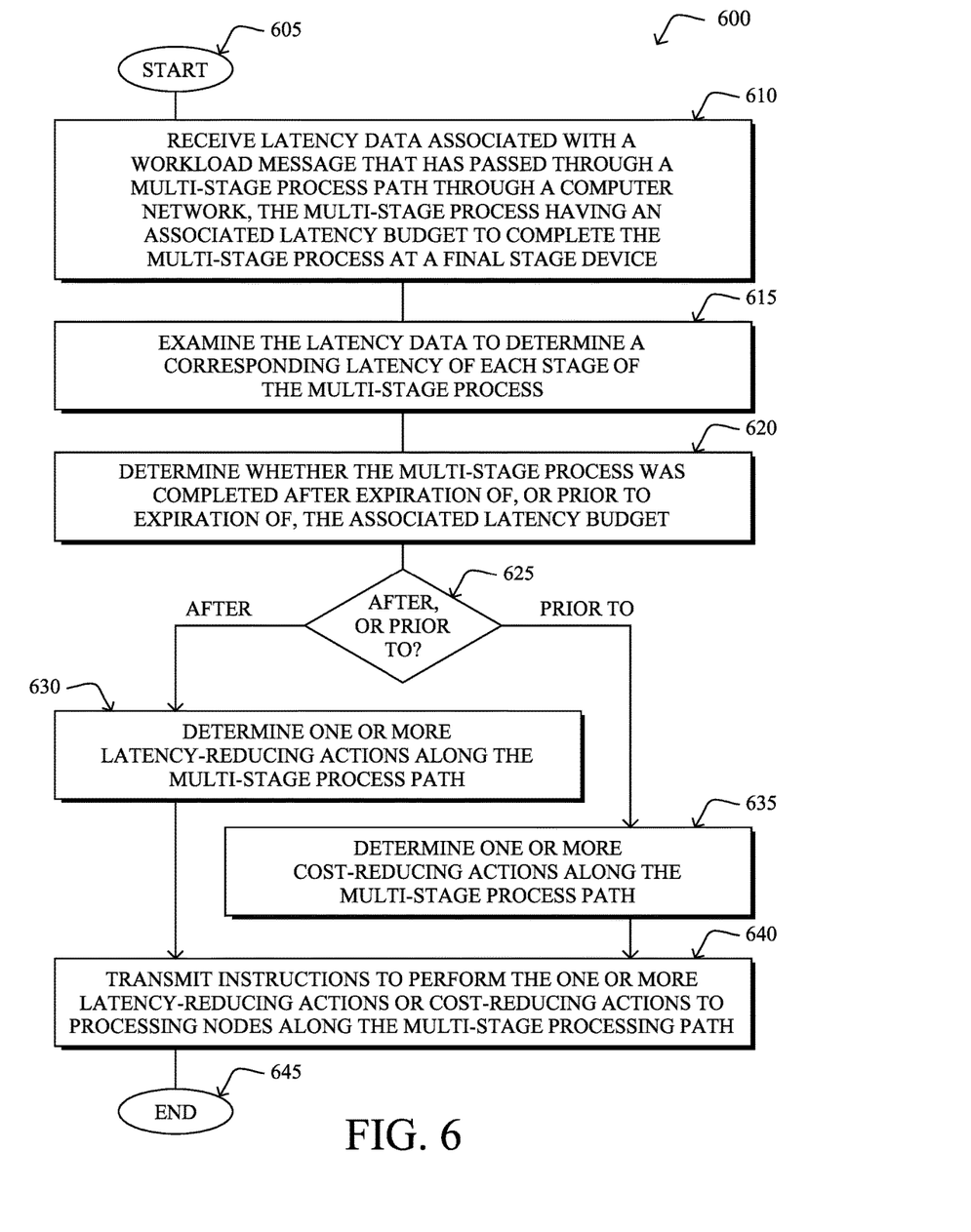
FIG. 6 illustrates another example simplified procedure for controlling latency in multi-layer fog networks, particularly from the perspective of a machine learning processing device.

Further, FIG. 6 illustrates another example simplified procedure for controlling latency in multi-layer fog networks in accordance with one or more embodiments described herein, particularly from the perspective of a machine learning processing device (e.g., server 116). For example, a non-generic, specifically configured device (e.g., device 200) may perform procedure 600 by executing stored instructions (e.g., process 248). The procedure 600 may start at step 605, and continues to step 610, where, as described in greater detail above, the processing device (e.g., learning machine, server 116, etc.) receives latency data associated with a workload message 400 that has passed through a multi-stage process path through a computer network (where, as detailed above, the multi-stage process has an associated latency budget to complete the multi-stage process at a final stage device). In step 615, the processing device may examine the latency data to determine a corresponding latency of each stage of the multi-stage process, such as from the arrival times 425 and departure times 430 for each intermediate node 435.

In step 620, the processing device may determine whether the multi-stage process was completed after expiration of, or prior to expiration of, the associated latency budget at the final stage device (i.e., behind schedule or ahead of schedule).

In response to the multi-stage process being completed after expiration of the associated latency budget in step 625, the processing device may determine one or more latency-reducing actions along the multi-stage process path in step 630, as detailed above (e.g., machine learning techniques to optimize (speed up) the process). Conversely, in response to the multi-stage process being completed prior to expiration of the associated latency budget in step 625, then in step 635 the processing device may determine one or more cost-reducing actions along the multi-stage process path, as also detailed above (e.g., machine learning techniques to optimize (reduce cost of or energy used by) the process).

In step 640, the processing device may transmit instructions to perform the one or more latency-reducing actions or one or more cost-reducing actions (or in certain circumstances, both) to processing nodes 320 along the multi-stage processing path 300. Said instructions may also influence the window of time values 440 pre-populated into the headers of workload messages 400, thereby dynamically balancing the time each processing node 320 allocates to complete its operations.

The procedure 600 may then end in step 645. Notably, though procedure 600 is shown for a single workload message, the techniques herein may be expanded to receive latency data associated with a plurality of workload messages for the multi-stage process over time, and could also receive latency data for all applications, users and tenants that share network 100. As such, the procedure 600 above may be used to determine trends in the latency data, and then to determine one or more latency-based changes along the multi-stage process path based on the trends in the latency data (e.g., latency-reducing and/or cost-reducing actions), in order to transmit corresponding instructions to perform the one or more latency-based changes to processing nodes along the multi-stage processing path.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, control latency in multi-layer fog networks. In particular, the techniques herein can actively control the round-trip latency of data passing through a multi-stage fog hierarchy. For instance, as described above, if an earlier processing stage of inter-fog link experienced longer than normal delays, the techniques herein can detect it, and try to compensate by simplifying later processing stages, or running them on higher performance resources or more resources in parallel (e.g., taking into consideration both energy and monetary costs associated with the acceleration). Excessive processing or link queuing delays can thus be compensated for by accelerating later stages of processing, and optional stages of a processing pipeline can be skipped on the fly if necessary. (Note that both processing latency and link latency are continuously monitored as the data passes through the system, and the system herein attempts to compensate if stages are running over their latency budgets.) Finally, machine learning techniques can learn a given system's behavior based on the techniques herein, and can assist in tuning its future decision making parameters.

Notably, the techniques herein measure the instantaneous latency through the hierarchical pipeline, and react directly to it, while there is still time to accelerate a potentially late result. While certain cloud orchestration systems may select cloud resources based on performance, such resources are not arranged in a hierarchy, and if performance targets are missed in early stages of a complex processing pipeline, there is currently nothing that such systems can do compensate.

While there have been shown and described illustrative embodiments that provide for controlling latency in multi-layer fog networks, it is to be understood that various other adaptations and modifications may be made within the spirit and scope of the embodiments herein. For example, while certain embodiments are described herein with respect to "Fog" or "IoT" networks in particular, the techniques are not limited as such and may be used with computer networks, generally, in other embodiments (e.g., hybrid cloud/fog networks, multi-stage processing pipelines exclusively in the cloud, and so on). In addition, while certain devices are shown, such as routers, access points, gateways, etc., other suitable devices may be used, accordingly. That is, the embodiments have been shown and described herein with relation to specific network configurations (orientations, topologies, protocols, terminology, etc.), and particularly to fog-based computing. However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at an intermediate node of a multi-stage process path through a computer network, a workload message with an associated latency budget to complete the multi-stage process at a final stage device;
   determining, by the intermediate node, a current latency from an initial stage device for the workload message to the receiving of the workload message;
   determining, by the intermediate node, a remaining portion of the latency budget based on the current latency;
   performing, by the intermediate node in response to the remaining portion of the latency budget being less than expected at the intermediate node, one or more latency-reducing actions; and
   transmitting, from the intermediate node, the workload message toward the final stage device.

2. The method as in claim 1, wherein performing one or more latency-reducing actions comprises:
   using faster processing hardware to complete a corresponding stage of processing at the intermediate node.

3. The method as in claim 1, wherein performing one or more latency-reducing actions comprises:
   using reduced complexity processing software to complete a corresponding stage of processing at the intermediate node.

4. The method as in claim 1, wherein performing one or more latency-reducing actions comprises:
   skipping a corresponding stage of processing at the intermediate node.

5. The method as in claim 1, wherein performing one or more latency-reducing actions comprises:
   skipping one or more subsequent intermediate nodes and corresponding stages of processing of the one or more subsequent intermediate nodes.

6. The method as in claim 1, further comprising:
   performing, in response to the remaining portion of the latency budget being greater than expected at the intermediate node, one or more cost-reducing actions.

7. The method as in claim 6, wherein performing one or more cost-reducing actions comprises:
   using slower, less costly resources to complete a corresponding stage of processing at the intermediate node.

8. The method as in claim 1, further comprising:
   recording, within the workload message, an arrival time of the workload message at the intermediate node; and
   recording, within the workload message, a departure time of the workload message from the intermediate node.

9. The method as in claim 1, wherein the multi-stage process comprises a multi-layer hierarchical fog process.

10. The method as in claim 9, wherein the multi-layer hierarchical fog process passes from a sensor node as the initial stage device along the path to an actuator node as the final stage device.

11. The method as in claim 9, wherein the multi-layer hierarchical fog process passes through one or more cloud nodes.

12. An apparatus, comprising:
    one or more network interfaces configured to communicate in a computer network;
    a processor coupled to the network interfaces and adapted to execute one or more processes; and
    a memory configured to store a process executable by the processor, the process when executed operable to:
    receive, as an intermediate node of a multi-stage process path through the computer network, a workload message with an associated latency budget to complete the multi-stage process at a final stage device;
    determine a current latency from an initial stage device for the workload message to the receiving of the workload message;
    determine a remaining portion of the latency budget based on the current latency;
    perform, in response to the remaining portion of the latency budget being less than expected at the intermediate node, one or more latency-reducing actions; and
    transmit the workload message toward the final stage device.

13. The apparatus as in claim 12, wherein the process, when executed to perform one or more latency-reducing actions, is further operable to:
    use faster processing hardware to complete a corresponding stage of processing at the intermediate node.

14. The apparatus as in claim 12, wherein the process, when executed to perform one or more latency-reducing actions, is further operable to:
    use reduced complexity processing software to complete a corresponding stage of processing at the intermediate node.

15. The apparatus as in claim 12, wherein the process, when executed to perform one or more latency-reducing actions, is further operable to:
    skip a corresponding stage of processing at the intermediate node.

16. The apparatus as in claim 12, wherein the process, when executed to perform one or more latency-reducing actions, is further operable to:
    skip one or more subsequent intermediate nodes and corresponding stages of processing of the one or more subsequent intermediate nodes.

17. The apparatus as in claim 12, wherein the process when executed is further operable to:
    perform, in response to the remaining portion of the latency budget being greater than expected at the intermediate node, one or more cost-reducing actions.

18. A method, comprising:
    receiving, at a processing device, latency data associated with a workload message that has passed through a multi-stage process path through a computer network, the multi-stage process having an associated latency budget to complete the multi-stage process at a final stage device;
    determining, by the processing device, that the multi-stage process was completed after expiration of the associated latency budget at the final stage device;
    examining, by the processing device, the latency data to determine a corresponding latency of each stage of the multi-stage process;
    determining, by the processing device in response to the multi-stage process being completed after expiration of the associated latency budget, one or more latency-reducing actions along the multi-stage process path; and
    transmitting, from the processing device, instructions to perform the one or more latency-reducing actions to processing nodes along the multi-stage processing path.

19. The method as in claim 18, further comprising:
    determining that the multi-stage process was completed prior to expiration of the associated latency budget at the final stage device;

determining, by the processing device in response to the multi-stage process being completed prior to expiration of the associated latency budget, one or more cost-reducing actions along the multi-stage process path; and transmitting, from the processing device, instructions to perform the one or more cost-reducing actions to processing nodes along the multi-stage processing path.

20. The method as in claim 18, further comprising:

receiving latency data associated with a plurality of workload messages for the multi-stage process over time;

determining trends in the latency data;

determining one or more latency-based changes along the multi-stage process path based on the trends in the latency data; and transmitting instructions to perform the one or more latency-based changes to processing nodes along the multi-stage processing path.

\* \* \* \* \*

UNITED STATES PATENT AND TRADEMARK OFFICE
CERTIFICATE OF CORRECTION

PATENT NO. : 10,218,781 B2
APPLICATION NO. : 15/491862
DATED : February 26, 2019
INVENTOR(S) : Byers et al.

Page 1 of 1

It is certified that error appears in the above-identified patent and that said Letters Patent is hereby corrected as shown below:

In the Specification

Column 1, Line 26, please amend as shown:
partitioned into multiple pipeline stages across the fog Column 4, Line 29, please amend as shown:
nodes may have two different types of network connec- Signed and Sealed this
Twenty-eighth Day of January, 2020

Andrei Iancu
*Director of the United States Patent and Trademark Office*